(12) United States Patent
Orellana

(10) Patent No.: US 10,738,982 B1
(45) Date of Patent: Aug. 11, 2020

(54) MOUNTING ASSEMBLY

(71) Applicant: U.S. Pole Company, Inc., Palmdale, CA (US)

(72) Inventor: Angel M. Orellana, Los Angeles, CA (US)

(73) Assignee: U.S. Pole Company, Inc., Palmdale, CA (US)

(*) Notice: Subject to any disclaimer, the term of this patent is extended or adjusted under 35 U.S.C. 154(b) by 0 days.

(21) Appl. No.: 15/803,366

(22) Filed: Nov. 3, 2017

(51) Int. Cl.
*F21V 21/116* (2006.01)
*F21V 21/14* (2006.01)
*F16M 13/02* (2006.01)

(52) U.S. Cl.
CPC ......... *F21V 21/116* (2013.01); *F16M 13/022* (2013.01); *F21V 21/14* (2013.01)

(58) Field of Classification Search
CPC ...... F21V 21/116; F21V 21/14; F16M 13/022
USPC .......... 248/121, 122.1, 125.1, 432; 362/382, 362/430, 431
See application file for complete search history.

(56) References Cited

U.S. PATENT DOCUMENTS

| 4,641,448 A | * | 2/1987 | Cobb | G09F 7/18 40/607.02 |
| 8,860,209 B1 | * | 10/2014 | Isaacson | F21V 21/14 257/712 |
| 9,322,536 B1 | * | 4/2016 | Parduhn | G08G 1/095 |
| 2004/0061032 A1 | * | 4/2004 | Bradford | F21V 21/116 248/218.4 |
| 2008/0087775 A1 | * | 4/2008 | Kuo | F16C 29/02 248/125.1 |
| 2016/0007488 A1 | * | 1/2016 | Neustadt | H05K 5/0221 455/552.1 |

* cited by examiner

*Primary Examiner* — Muhammad Ijaz
(74) *Attorney, Agent, or Firm* — Lewis Roca Rothgerber Christie LLP

(57) ABSTRACT

A mounting assembly to mount a device onto a pole, has a reversible plate configured to engage a housing in one of two orientations, depending on whether the pole presents a flat surface or a curved surface. The plate has a first or flat surface, a second or curved surface, and opposing side edges, each of the side edges having a first sliding engagement formation. The housing has a main panel, and opposing side panels, the main panel configured for attachment to the device, each of the side panels having a second sliding engagement formation complementary to the first sliding engagement formation.

19 Claims, 15 Drawing Sheets

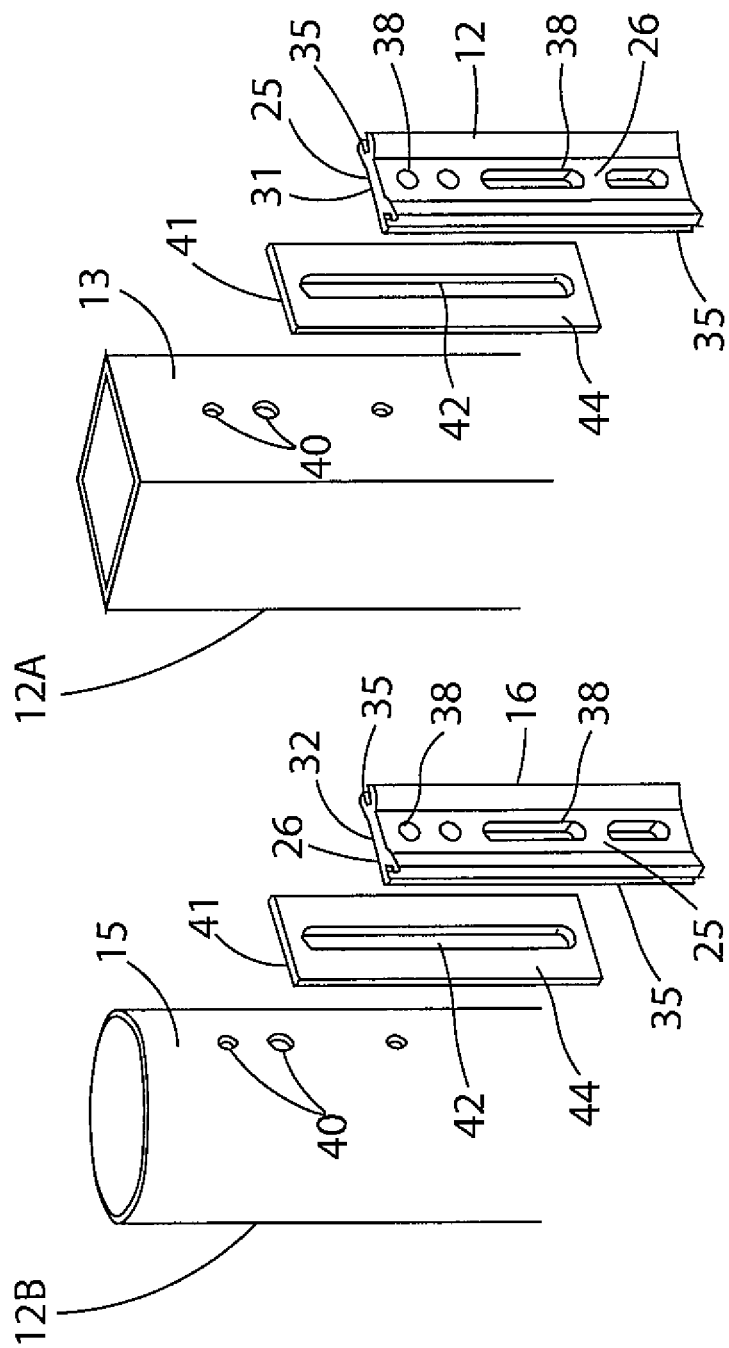

MOUNTING ASSEMBLY

FIELD OF INVENTION

The present invention relates to mounting assemblies, in particular, mounting assemblies for poles having different cross-sectional shapes or profiles.

BACKGROUND OF INVENTION

Conventional utility and outdoor poles come with two general cross-sectional shapes or profiles: rectangular or circular. While mounting assemblies are known, conventional mounting assemblies are typically adapted for either poles with a rectangular cross-section or poles with a circular cross-section, but not both. Accordingly, there is a desire for a mounting assembly that is adaptable for use with either such poles as the need or desire arises, and so that a device mounted to a pole with a rectangular cross-section can be readily removed and mounted to a pole with a circular cross-section, and vice versa.

SUMMARY OF THE INVENTION

Embodiments of the present invention includes a mounting assembly configured to mount a device onto a pole, having a reversible plate configured to engage a housing in one of two orientations, depending on whether the pole presents a flat surface or a curved surface.

In some embodiments, the mounting assembly includes a reversible plate and a housing, wherein the plate is configured to slidably engage with the housing in one of a forward orientation and a reverse orientation, wherein the plate has a body with a first surface, a second surface different from the first surface, and opposing side edges, each of the side edges having a first sliding engagement formation, wherein the housing has a main panel, and opposing side panels, the main panel configured for attachment to a device to be mounted on the pole, each of the side panels having a second sliding engagement complementary to the first sliding engagement formation of the plate, and wherein the first sliding engagement formations lie in a first plane, and the second engagement formations lie in a second plane, the first and second planes being coplanar when the plate and housing are engaged, the first sliding engagement formations symmetrically bisected by the first plane and the second sliding engagement formations symmetrically bisected by the second plane.

In some detailed embodiments, the first surface is generally planar and the second surface is generally nonplanar.

In some detailed embodiments, the first surface is generally flat and the second surface is generally concave.

In some detailed embodiments, each of the first sliding engagement formations includes a groove, and each of the second sliding engagement formations includes a ridge.

In some detailed embodiments, the device is a luminaire assembly.

In some detailed embodiments, the mounting assembly further comprises a top panel.

In some detailed embodiments, the mounting assembly further comprises a bottom panel.

In some detailed embodiments, each of the plate and the main panel includes at least one through-hole.

In some detailed embodiments, the through-hole is configured to receive a fastener.

In some detailed embodiments, the through-hole is configured to pass one wire extending from the device.

In some detailed embodiments, the through-hole is elongated.

In some detailed embodiments, each side panels has a distal portion and a proximal portion that define an angle $\beta$ therebetween, wherein the angle $\beta$ ranges between about 120 and 180 degrees.

In some detailed embodiments, the angle $\beta$ ranges between about 120 and 135 degrees.

In some detailed embodiments, each proximal portion of each side panel defines an angle $\alpha$ with the main panel, wherein the angle $\alpha$ ranges between about 90 and 120 degrees.

In some embodiments, a mounting assembly for releasably mounting a device on a pole, comprises a plate and a housing configured for sliding engagement, wherein the plate has first and second opposing surfaces, the first opposing surface being generally flat and the second opposing surface having a concavity, the plate also has opposing side edges, each side edge having a first sliding engagement formation, wherein the housing has a main panel and opposing side panels, each side panel having a second sliding engagement formation complementary to the first sliding engagement formation for sliding engagement therewith, the main panel is configured for attachment to the device, wherein the first sliding engagement formations lie in a first plane, and the second sliding engagement formations lie in a second plane, the first and second planes being coplanar when the plate and housing are slidably engaged, wherein each of the first sliding engagement formations is symmetrically bisected by the first plane and each of the second sliding engagement formations is symmetrical bisected by the second plane, and wherein each side panel has a proximal portion and a distal portion that defines an angle $\beta$ therebetween, the angle $\beta$ ranging between about 120 and 135 degrees.

In some detailed embodiments, the first sliding engagement formation includes a groove and the second sliding engagement formation includes a ridge.

In some detailed embodiments, the first sliding engagement formation includes a ridge and the second sliding engagement formation includes a groove.

In some detailed embodiments, the plate includes at least one through-hole.

In some detailed embodiments, the main panel of the housing includes at least one through-hole.

In some detailed embodiments, the mounting assembly further comprises a top panel.

In some embodiments, the mounting assembly for use in mounting a device interchangeably on a pole with a flat surface or a pole with a curved surface, includes a reversible plate and a housing. The plate has a flat surface on one side adapted for mounting on the pole with a flat surface and a curved surface on an opposite side adapted for mounting on the pole with a curved surface. The plate and the housing have complementary grooves and ridges for reversible sliding engagement with each other, wherein the grooves and ridges are configured with symmetry such that the plate is adapted to engage the housing in a first or forward orientation when the flat surface of the plate is mounted on the pole with a flat surface and in a second or reverse orientation when the curved surface of the place is mounted on the pole with a curved surface.

BRIEF DESCRIPTION OF THE DRAWINGS

These and other features and advantages of the present invention will be better understood by reference to the following detailed description when considered in conjunction with the accompanying drawings wherein:

FIG. 6A is a perspective view of a plate oriented for mounting on a flat pole, with a gasket therebetween, in accordance with an embodiment.

FIG. 6B is a perspective view of a plate oriented for mounting on a round pole, with a gasket therebetween, in accordance with an embodiment.

DETAILED DESCRIPTION OF THE INVENTION

Figure 1:
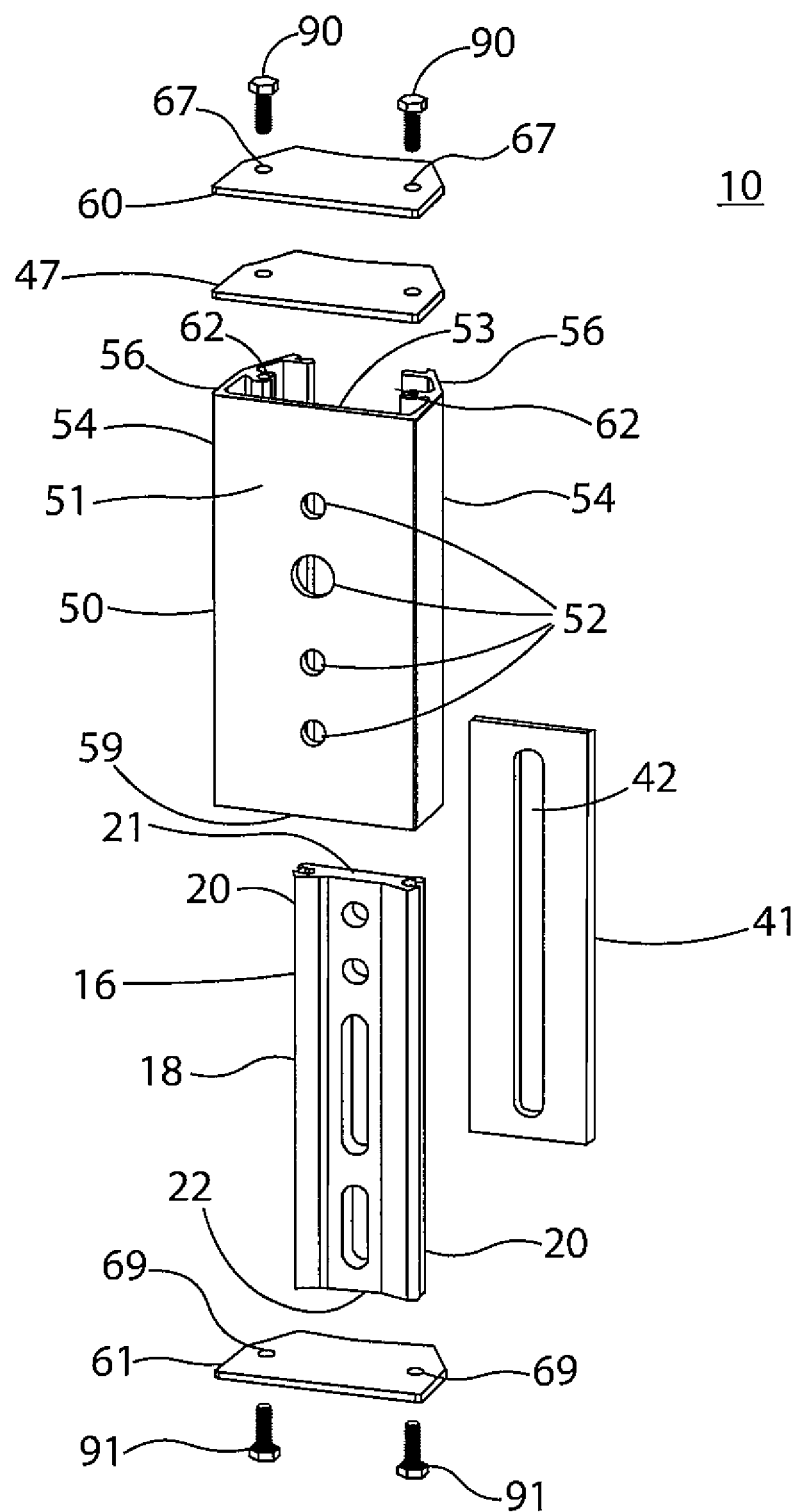
FIG. 1 is an exploded perspective view of a mounting assembly in accordance with an embodiment.
Figure 2:
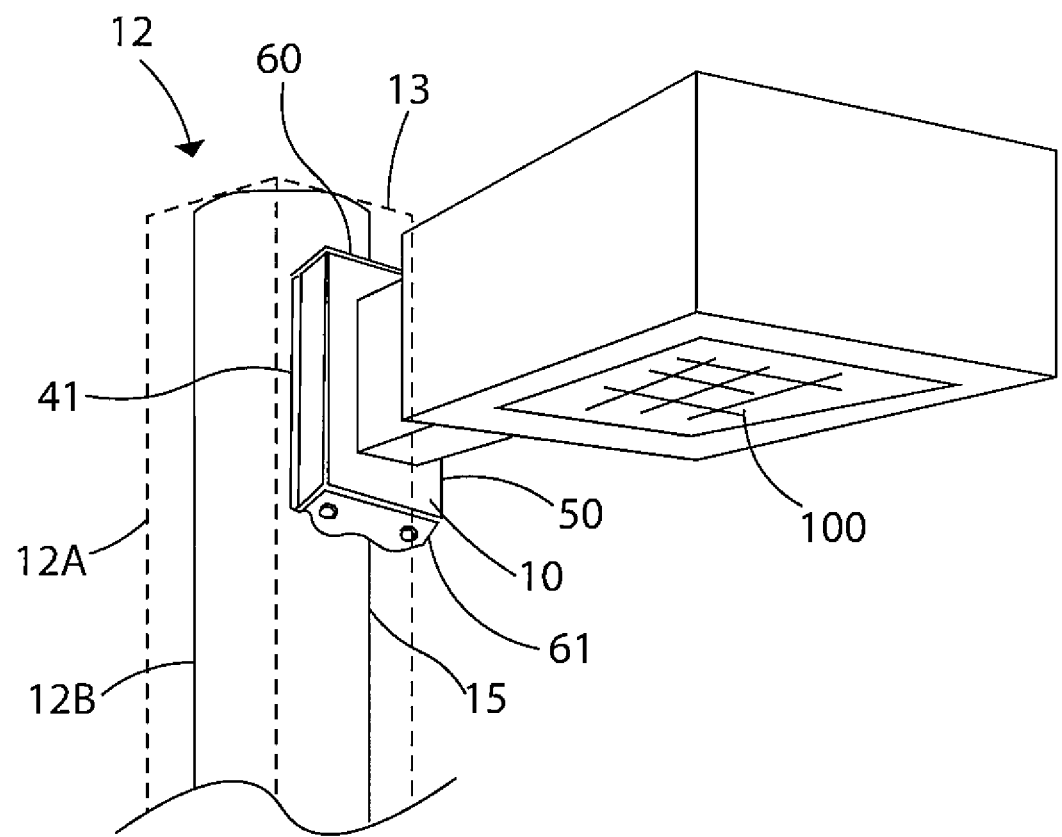
FIG. 2 is a perspective view of a mounting assembly in use with a device for mounting on a pole, in accordance with an embodiment.

FIG. 1 and FIG. 2 illustrate an embodiment of a mounting assembly 10, for use in mounting a device 100 on a pole 12, including, for example, either a pole 12A with a planar sidewall portion 13 or a pole 12B with a nonplanar sidewall portion 15 defining a curvature or a convexity. As shown in FIG. 1, the assembly 10 includes a reversible plate 16 having a generally rectangular body 18 with opposing side edges 20 and opposing top edge 21 and bottom edge 22. The assembly 10 also includes a housing 50 configured to interface with both the device 100 and the plate 16. In some embodiments, the housing 50 is configured for fixed engagement with the device 100 and releasable sliding engagement with the plate 16. In the illustrated embodiment, the device 100 is a luminaire assembly for mounting on the pole 12.

Figure 3A:
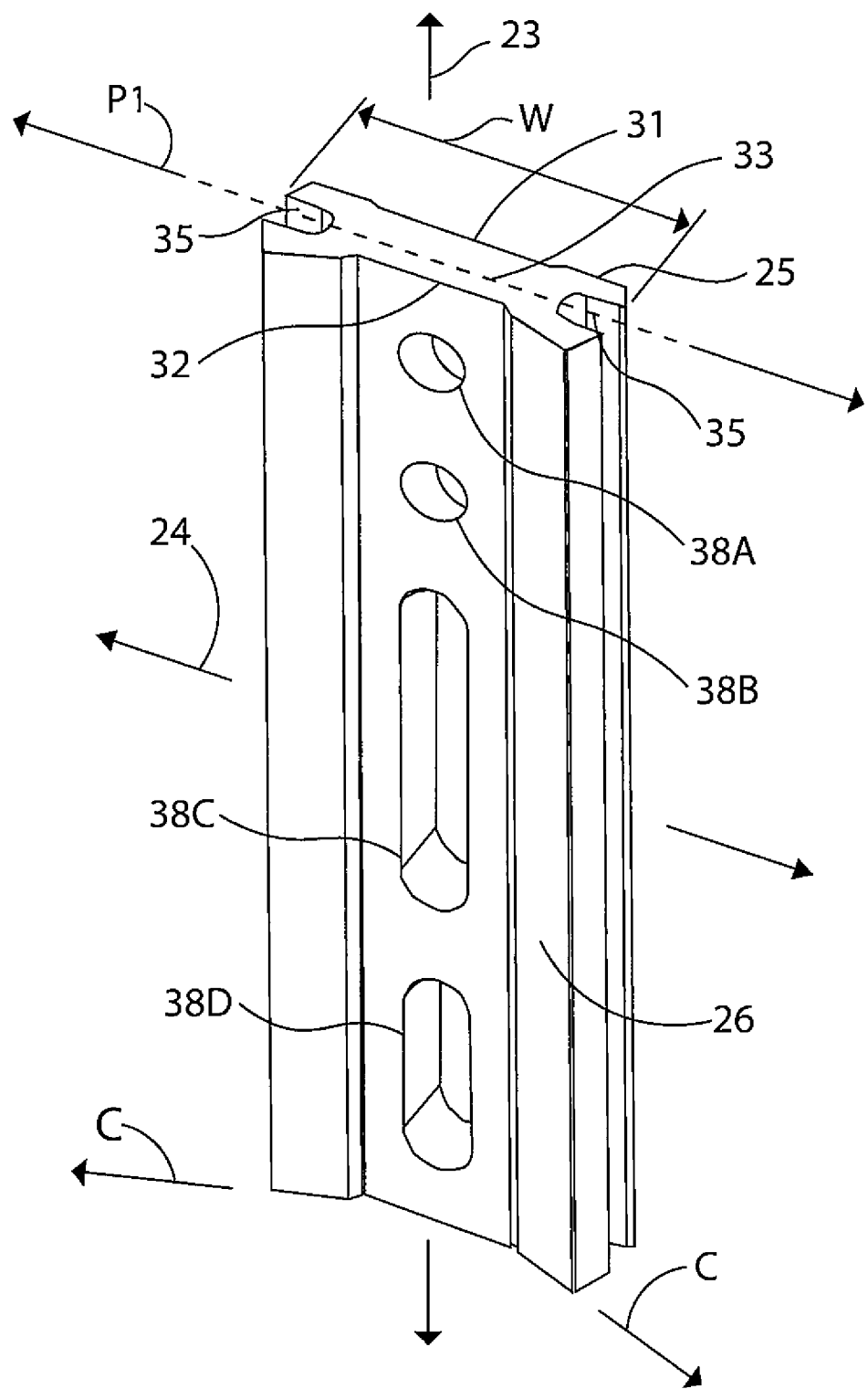
FIG. 3A is a perspective view of a plate of the mounting assembly of FIG. 1.
Figure 3B:
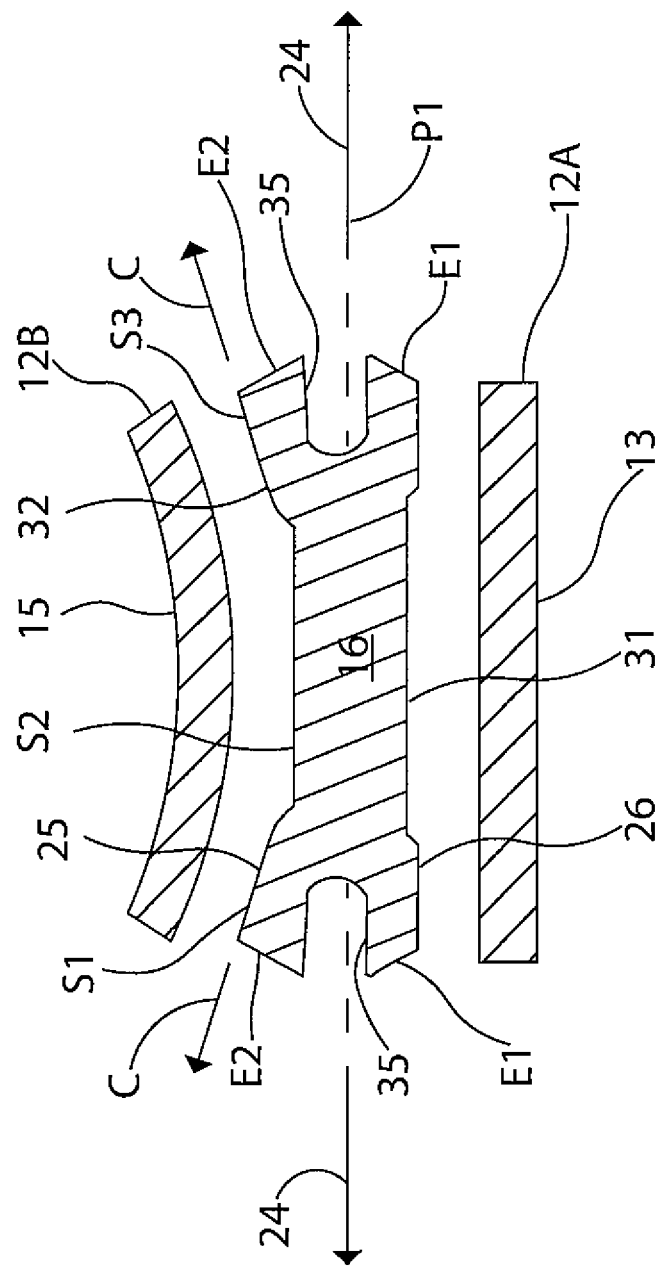
FIG. 3B is an end cross-sectional view of the plate of FIG. 3A, adjacent a mounting flat surface and a curved mounting surface.

With reference to FIG. 3A and FIG. 3B, in some embodiments of the mounting assembly 15, the plate 18 has a rectangular body 18 defined by a length L along a longitudinal axis 23, a width W along a lateral axis 24. The plate 18 has a first face or front surface 25 and a second face or back surface 26. The first surface 25 is generally planar or flat and thus generally conforming to the planar sidewall portion 13 of the pole 12A and well-suited for mounting against the planar sidewall portion 13. The second surface 26 is nonplanar, including a curvature or concavity C along the lateral axis 24 and thus generally conforming to the curved sidewall portion 15 of the pole 12B and well-suited for mounting against the curved sidewall portion 15. Each of the first and second surfaces 25 and 26 presents a slight depression in forming a respective shallow and flat longitudinal channel 31, 32. In between the channels 31 and 32 is a center portion 33 of the body 18. It is understood that the curvature or concavity C of the second surface 26 may include a combination of multiple surfaces, e.g., surfaces S1, S2 and S3, arranged in an angularly-offset manner, as shown in FIG. 3B, wherein the surfaces S1 and S3 may themselves be planar or curved. In any case, each of the side edges 20 is formed with a sliding engagement formation, e.g., a recess or groove 35, extending longitudinally between the top and bottom edges 21 and 22.

Figure 5:
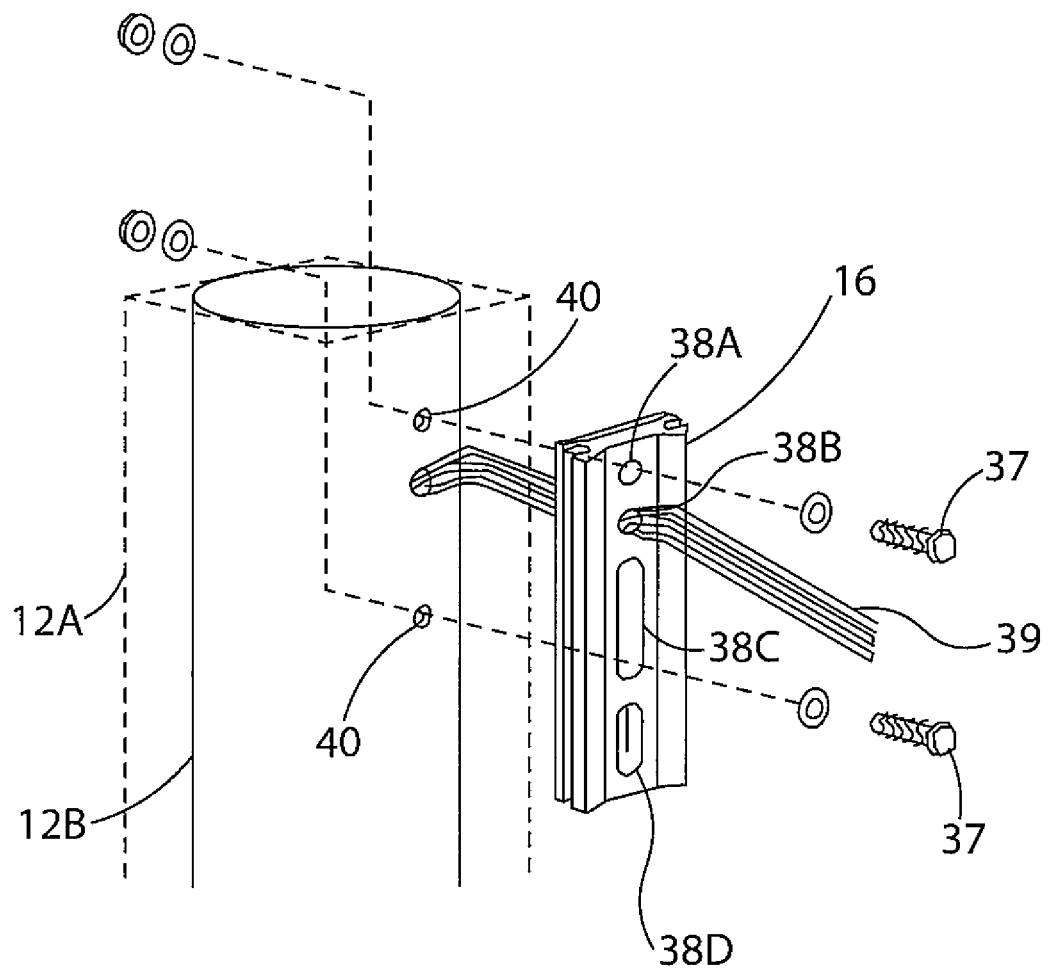
FIG. 5 is an exploded perspective view of a plate oriented for mounting on a curved pole (shown in solid lines), with wires/cables extending through the plate and the pole, in accordance with an embodiment.

Formed in the center portion 33 between the channels 31 and 32 are a plurality of through-holes 38, including through-holes 38A, 38B, 38C and 38D. As shown in FIG. 5, selected through-holes, for example, through-holes 38A and 38C, receive fasteners 37 (e.g., bolts, screws, etc.) for fastening and mounting the plate 16 to the pole 12A (shown in broken lines) or the pole 12B (shown in solid lines) via openings 40 preformed in the sidewall of the pole 12A, 12B. The channels 31 and 32 provide a flat surface against which heads of the screw fasteners 37 can abut and be tightened. Depending on the configuration of the pole, the plate 16 may be oriented forwardly with the front planar surface 25 facing the pole 12A, as shown in FIG. 6A, or reversely with the reverse nonplanar surface 26 facing the pole 12B, as shown in FIG. 6B. As illustrated, the selected one or more through-holes 38 may have different sizes and configurations so one or more wires/cables 39 from the device 100 can pass through the plate 16, and into a selected preformed opening 40 in the pole, as shown in FIG. 5. Moreover, an elongated through-hole 38C allows the fastener 37 access to an opening 40 in the pole 12A/12B through the plate 16 without requiring elevational alignment between an otherwise smaller through-hole 38 and the opening 40, as shown in FIG. 5. In some embodiments, the plate 16 is versatile so as to be mounted to any pole with pre-existing openings 40 that are separated from each other a distance, for example, ranging anywhere between about 2 inches to 6 inches, along a straight line on center with the plate 16, with solely two fasteners 37.

Figure 7A:
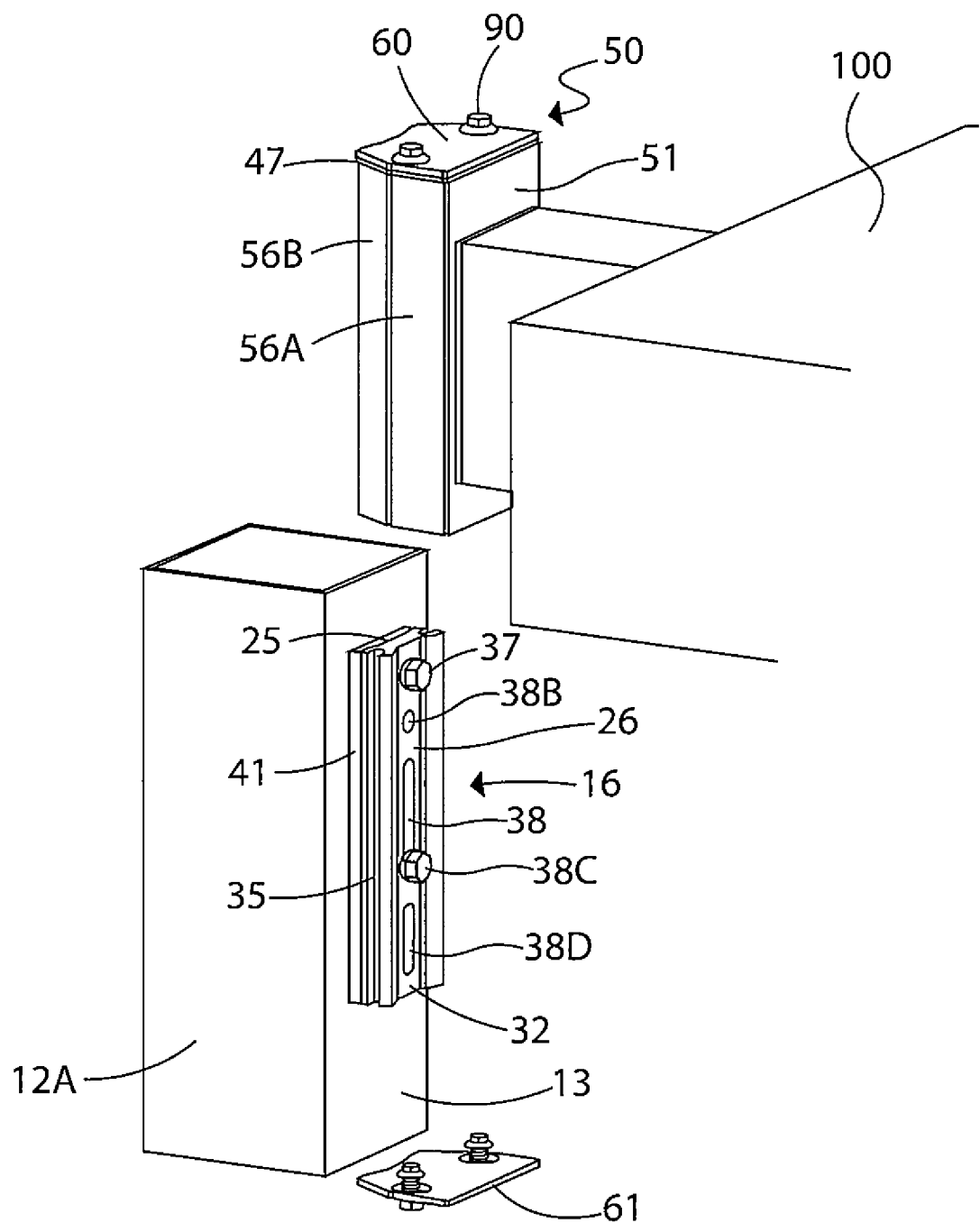
FIG. 7A is a perspective view of a plate and a gasket mounted on a flat pole, ready to slidably engage with a housing attached to device.
Figure 7B:
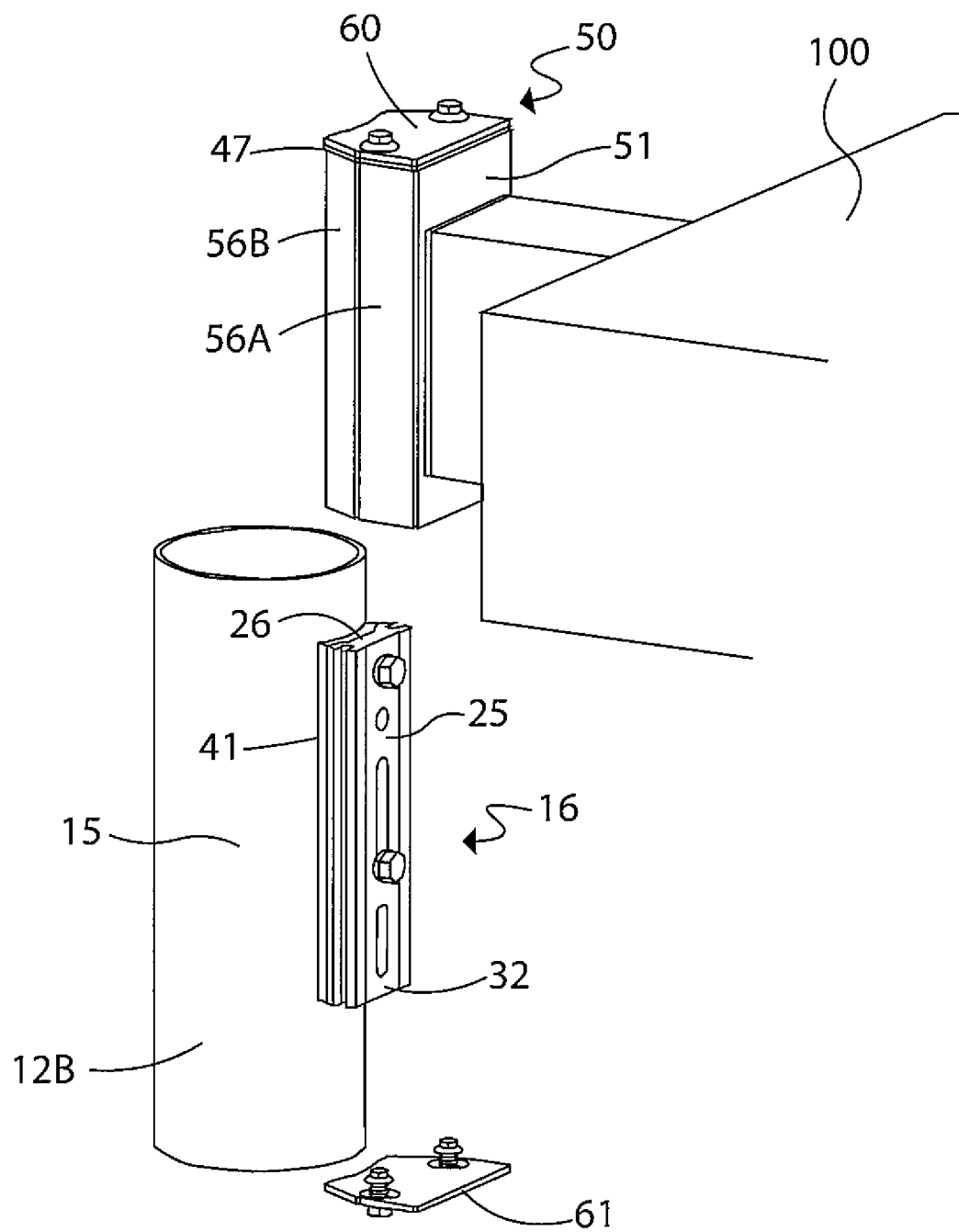
FIG. 7B is a perspective view of a plate and a gasket mounted on a round pole, ready to slidably engage with a housing attached to device.

The plate 16 can mounted in one orientation ("forwardly") to the pole 12A (FIG. 6A) or in another orientation ("reversely") to the pole 12B (FIG. 6B). In either case, a gasket 41 of elastomeric material, e.g., in the form of a rectangular cushion pad, may be situated between the plate 16 and the pole 12A, 12B to cushion the plate 16 and ensure a tight and secure fit between the plate 16 and the pole. The gasket 41 can be configured with a shape and size comparable to the shape and size of the plate 16 so that it presents a similar profile as the plate 16 when the plate 16 is mounted on the pole. A face of the gasket facing the plate 16 may include a coating of adhesive 44 for affixing the gasket 41 to the plate 16. The gasket 41 is configured with an opening or slot 42 that is in general elevational alignment with the channel 31, 32, and in particular, with the through-holes 38 so as not to block the fasteners 37 or the wires/cables 39 when these latter elements are inserted into the through-holes 38 to reach the openings 40. So mounted, the plate 16 is secured to the pole with the grooves 35 exposed and ready to receive the housing 50, as shown in FIG. 7A and FIG. 7B.

Figure 4:
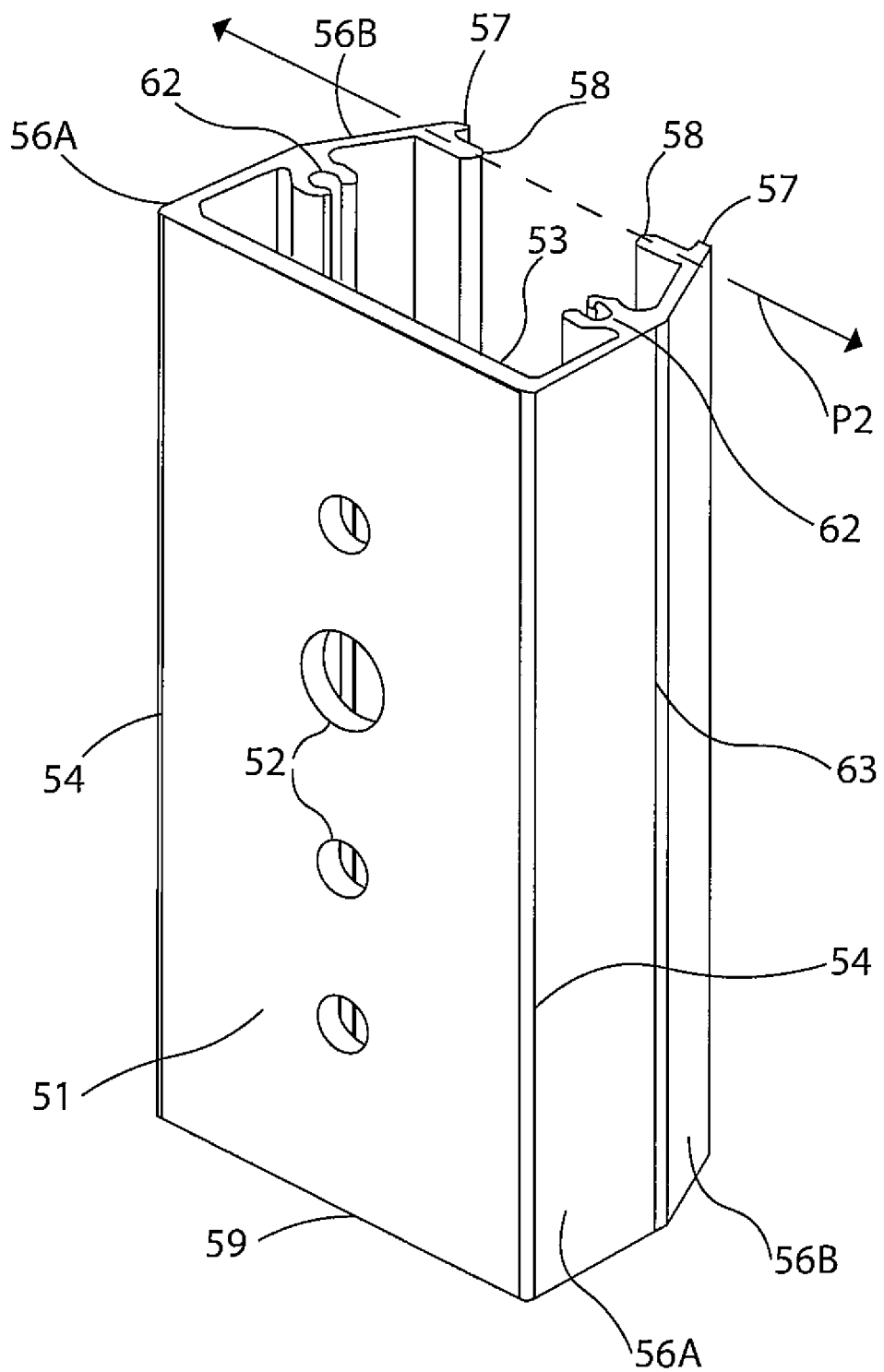
FIG. 4 is a perspective view of a housing of the mounting assembly of FIG. 1.
Figure 8:
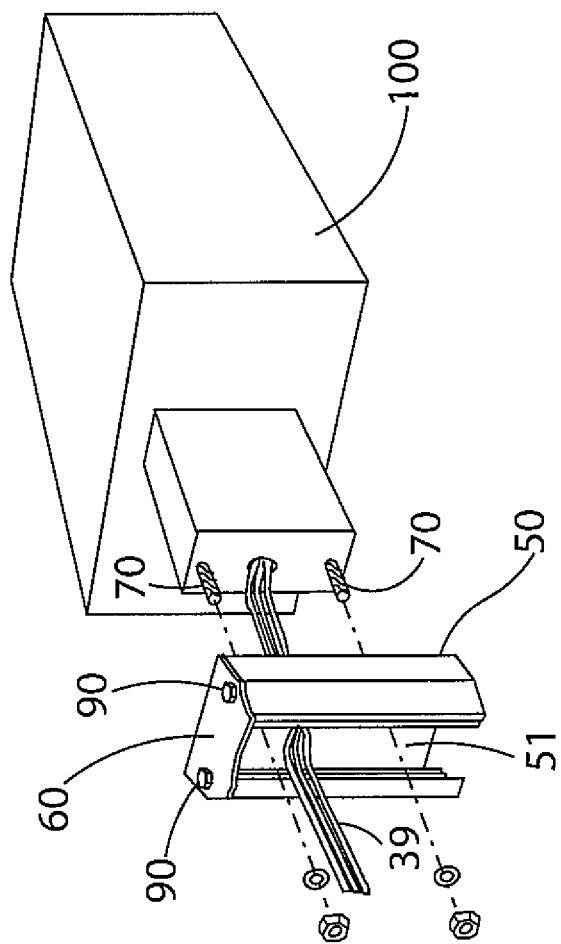
FIG. 8 is an exploded perspective view of a housing affixed to a device, in accordance with an embodiment.

Prior to the housing 50 being mounted on the plate 16, the housing 50 is secured to the device 100 that is to be mounted on the pole 12, as shown in FIG. 8. With reference to FIG. 1 and FIG. 4, the illustrated embodiment of the housing 50 includes a main panel 51, a top panel 60 and a bottom panel 61. The housing 50 also has two side panels 56, a top edge 53 and a bottom edge 59. The main panel 51 may have a similar shape and size as the plate 16. The main panel 51 includes a plurality of through-holes 52 for receiving one or more fasteners 70 (see FIG. 8) that affix the main panel 51 of the housing 50 to the device 100. In in the illustrated embodiments, the fasteners 70 extend from the device 100 into the housing 50, although it is understood that the fasteners 70 may extend from the housing 50 into the device 100. The wires/cables 39 from the device 100 can be passed into the housing 50 through one or more of the through-holes 52 in the main panel 51.

Figure 9A:
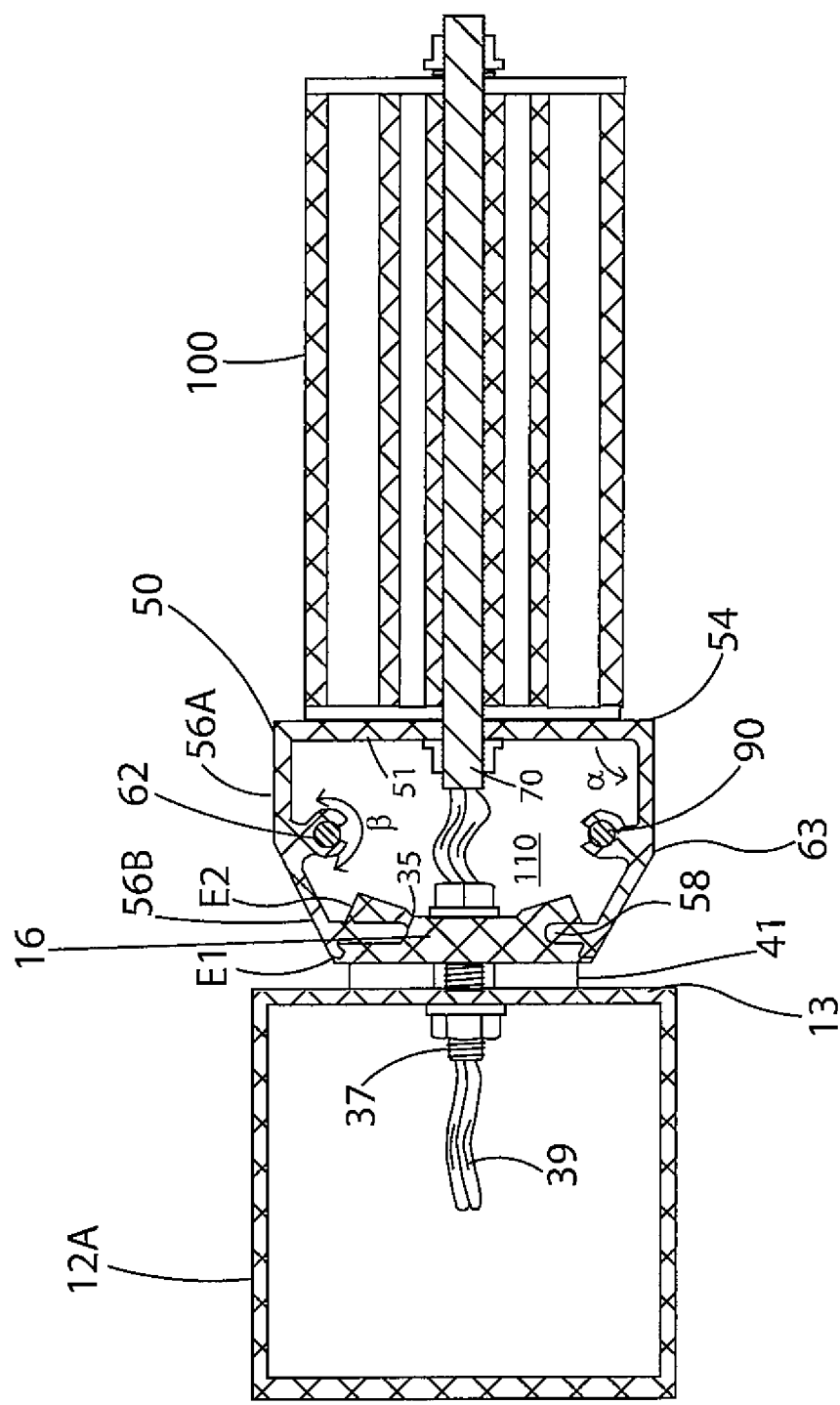
FIG. 9A is an end cross-sectional view of a mounting assembly with a device affixed thereto, mounted on a pole with a flat surface, in accordance with an embodiment.
Figure 9B:
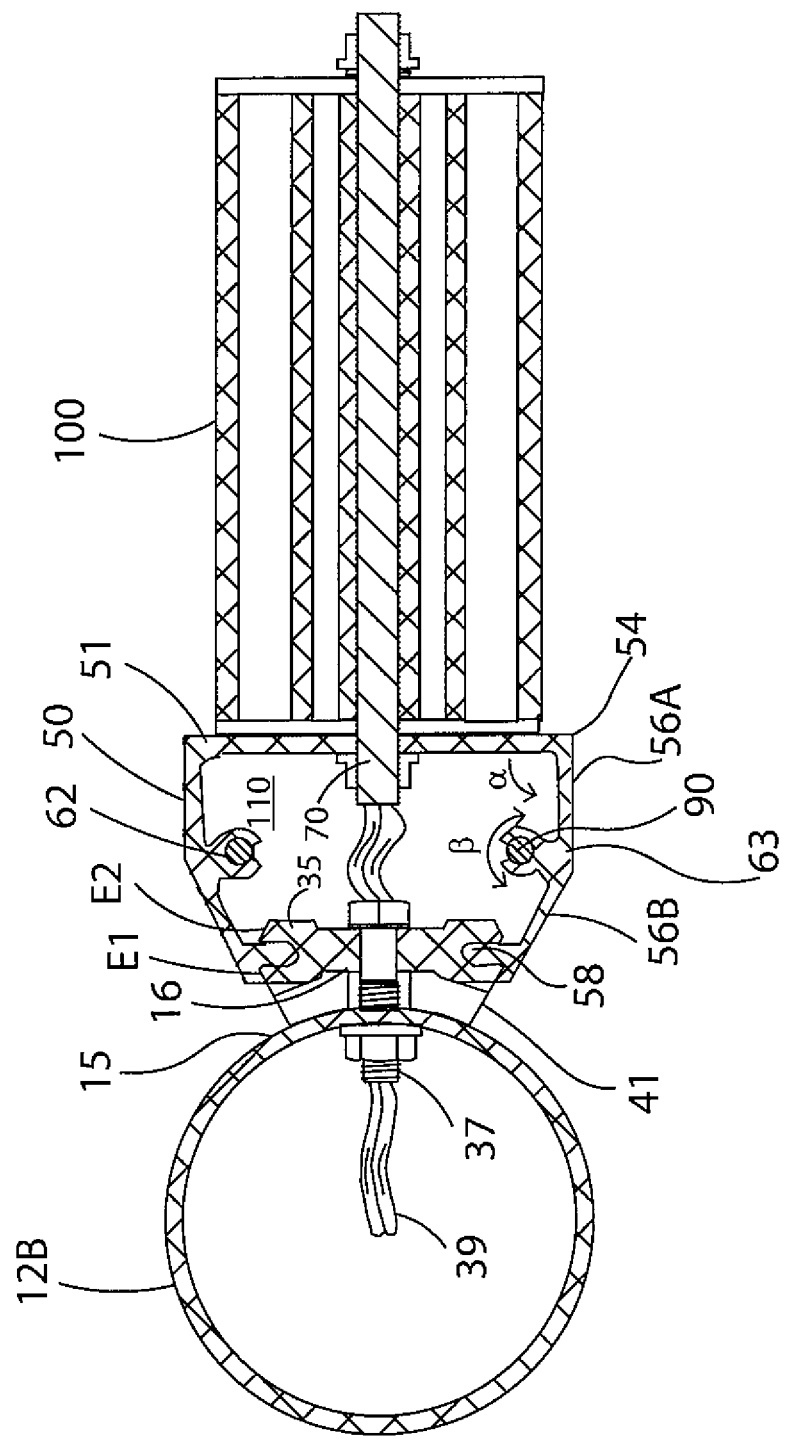
FIG. 9B is an end cross-sectional view of a mounting assembly with a device affixed thereto, mounted on a pole with a curved surface, in accordance with another embodiment.

Side panels 56 are configured to extend at an angle α from side edges 54 of the main panel 51, where α ranges between about 90 (see, e.g., FIG. 11A and FIG. 11B) and 120 degrees (see, e.g. FIG. 9A and FIG. 9B). The side panels 56 and the main panel 51 are configured to provide the housing 50 with a generally U-shaped or C-shaped cross-section with the housing 50 wrapping around to surround or enclose the plate 16 when the housing 50 is mounted on the plate 16. In the illustrated embodiment of FIG. 9A and FIG. 9B, where α is greater than 90, e.g., about 120 degrees, each side panel 56 has a first/proximal portion 56A and a second/distal portion 56B, with a crease line 63 (see FIG. 4) extending longitudinally therebetween, where the first and second portions 56A and 56B define an angle β therebetween, with β ranging between about 120-135 degrees.

As perhaps best shown in FIG. 4, each distal portion 56B has a side edge portion 57 that is formed with another sliding engagement formation, e.g., an inwardly extending ridge 58 that is configured for insertion and sliding engagement with a respective groove 35 of the plate 16 for mounting the device 100 on the flat pole 12A, as shown in FIG. 9A, and for mounting the device 100 on the curved pole 12B, as shown in FIG. 9B. The sliding engagement formation of the plate 16 and the sliding engagement formation of the housing 50 (whether one is the groove and the other is the ridge, or vice versa) are complementary to each other in allowing releasable locking between the plate 16 and the housing 50.

Figure 10:
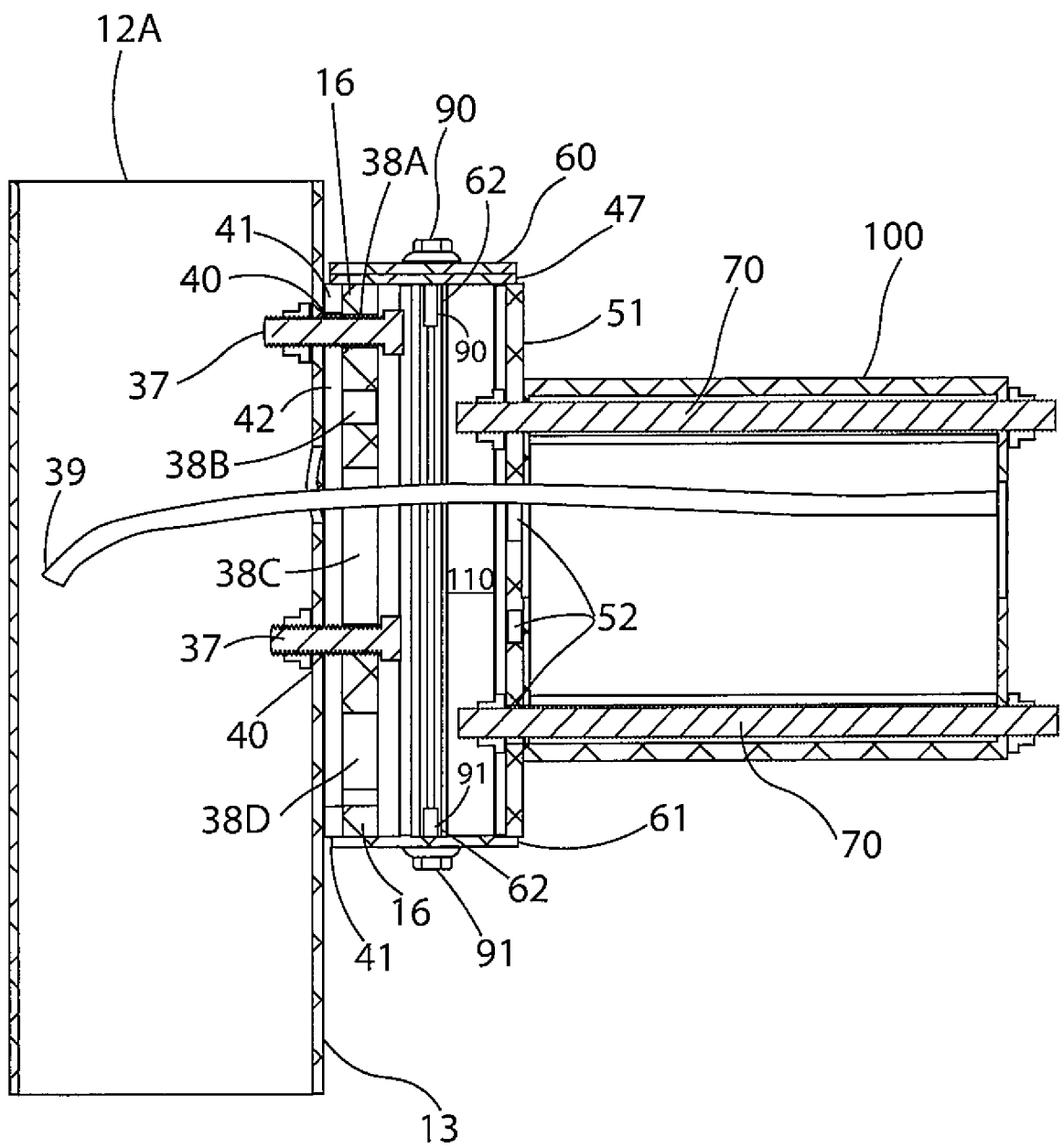
FIG. 10 is a side cross-sectional view of a mounting assembly with a device affixed thereto, mounted on a pole, in accordance with an embodiment.

In the illustrated embodiment, an upper recess 62 is formed on each crease line 63 at or near the top edge 53, as also perhaps best shown in FIG. 4. The upper recesses 62 are configured to receive fasteners 90 (see FIG. 1) for affixing the top panel 60 via through-holes 67 to the top edge 53 of the housing 50. After the top panel 60 is securely affixed to the top edge 53 of the housing 50, as shown in FIG. 8, the housing 50 (with the device 100 affixed thereto by the fasteners 70) is mounted on the plate 16, as shown in FIG. 7A and FIG. 7B, by positioning the housing 50 above the plate 16, engaging each ridge 58 in a respective groove 35, and sliding the housing 50 (with the affixed device 100) downwardly until a bottom surface of the top panel 60 abuts the top edge 21 of the plate, as shown in FIG. 10. The top panel 60 thus acts as a stop that retains the housing 50 and plate 16 in engagement with each other and prevents the housing 50 from sliding downwardly by the pull of gravity and disengaging from the plate 16. In that regard, a gasket 47 in a shape and size similar to the top panel 60 may be positioned between the top panel 60 and the top edge 53 to cushion the top panel 60 against the housing 50. It is understood that the top panel 60 may be affixed to the housing 50 after the housing 50 has been placed in sliding engagement with the plate 16, although the housing 50 (with the device 100 affixed thereto) should be supported against any pull of gravity before the top panel 60 is affixed to the housing 50.

In some embodiments, the device 100 is a luminaire assembly for mounting on a pole. And, where the housing 50 supports the luminaire assembly on the pole as an arm mount, the side panels 56, including the proximal and distal portions 56a and 56b, may be configured with greater or lesser depth D for different distances at which the luminaire assembly is positioned from the pole, for functional and/or aesthetics purposes.

As shown in FIG. 1, the bottom panel 61 may also be provided with through-holes 69 that align with bottom recesses 64 (not shown) at or near the crease line 63, to receive fasteners 91 for affixing the bottom panel 61 to the bottom edge 59 of the housing 50. In some embodiments, the top and bottom recesses 62 and 64 are aligned with each other and may be a continuous formation extending along the crease lines 63 between the top and bottom edges 53 and 59 of the housing 50, as shown in FIG. 10.

With the housing 50 surrounded by the top and the bottom panels 60 and 61, an enclosed interior cavity 110 is provided by the assembled mounting assembly 10 that is protected from environmental elements, including sun, dirt and rain, especially if the device 100 is mounted on an outdoor pole 12, such as an outdoor electrical luminaire assembly.

In the event the device 100 is to be removed from the pole 12A (with the planar surface 13) for mounting on the pole 12B (with the curved surface 15), the fasteners 90 and 91 are removed to release the top and bottom panels 60 and 61, respectively, from the housing 50. The housing 50 is then released for sliding movement upwardly or downwardly past the plate 16 to disengage from the plate 16. The fasteners 37 are then removed to release the plate 16 and the gasket 41 from the pole 12A.

To mount the housing 50 onto the pole 12B with the curved surface 15, the wires/cables 39 are fed through one or more through-holes 38 in the plate 16, the slot 42 in the gasket 41 and one or more openings 40 in the pole 12B. Notably, the wires/cables 39 are fed through the plate 16 with the plate reversed so that the second surface 26 with the concavity C faces the gasket 41 and the pole 12B. The gasket 41 and the plate 16 are placed onto the curved surface 15 with the slot 42 of the gasket positioned over the openings 40 in the pole 12B. The fasteners 37 are inserted into the through-holes 38 of the plate 16, the slot 42 in the gasket 41, and the into the openings 40 in the pole 12B to affix the plate 16 and the gasket 41 to the pole 12B.

Notably, the gasket 41 is constructed of a flexible and/or elastic material such that it conforms to any gap between the first (flat) surface 25 of the plate 16 and the pole 12A, or any gap between the second (curved) surface 26 of the plate 16 and the pole 12B. Thus, where the concavity C of the second surface 26 is not identical to the curvature of the pole 12B, the gasket 41 nevertheless enables the mounting assembly 10 be rigidly mounted on the pole 12B.

The top panel 60 and the gasket 47 are then mounted on the top edge 53 of the housing 50 by the fasteners 90, and the housing 50 is then slid onto the plate 16 with the ridges 58 received in and engaged with the grooves 35, until the top panel 60 and the gasket 47 abut the top edge 21 of the plate 16. The bottom panel 61 is then affixed to the bottom edge 59 of the housing 50 with the fasteners 91.

To enable engagement between the grooves 35 of the plate 16 and the ridges 58 of the housing 50 whether the plate 16 is oriented forwardly or reversely in the housing 50, each of the housing's sliding engagement formation, e.g., ridge 58, is advantageously configured to lie in a plane P2 parallel to the main panel 51, as better seen in FIG. 4, and each of the plate's sliding engagement formation, e.g., groove 35, is advantageously configured to lie in a corresponding plane P1 that is in alignment or coplanar with plane P2 when the house 50 and the plate 16 are in engagement. In that regard, each of the grooves 35 is configured such that it is symmetrical (e.g., a mirror image of each other) on each side of the plane P1 and each of the ridge 58 is configured such that it is symmetrical (or a mirror image of each other) on each side of the plane P2. As such, each sliding engagement formation or groove 35 is symmetrically bisected by the plane P1 and each sliding engagement formation or ridge 38 is symmetrically bisected by the plane P2. As such, the sliding engagement formations of the ridges 58 and the grooves 35 are nondiscriminatory of the orientation of the plate 16 and the housing 50 and can readily engage with each other regardless of whether the first surface 25 or the second surface 26 of the plate 16 is facing the housing 50. In that regard, it is understood that each of side edge portions E1 (closer to the first/flat surface 25) of the plate 16 and each of side edge portions E2 (closer to the second/nonplanar surface 26) of the plate 16 is also symmetrically angled on each side of the plane P1 so that each side edge portion can fit indiscriminately between the distal portions 56B of the side panels 56 regardless of whether the first surface 25 or the second surface 26 is facing the housing 50.

Figure 11A:
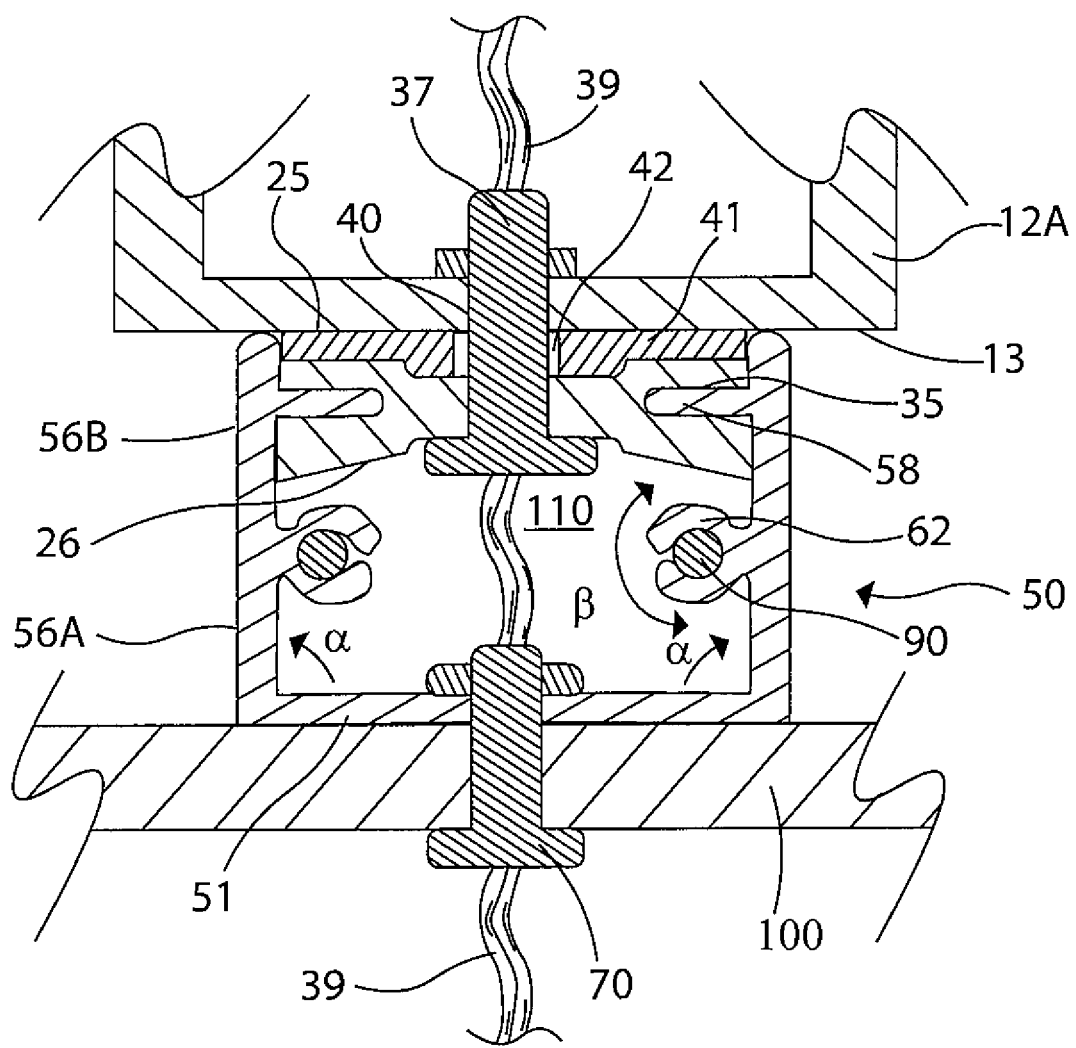
FIG. 11A is an end cross-sectional view of a mounting assembly with a device affixed thereto, mounted on a pole with a flat surface, in accordance with another embodiment.
Figure 11B:
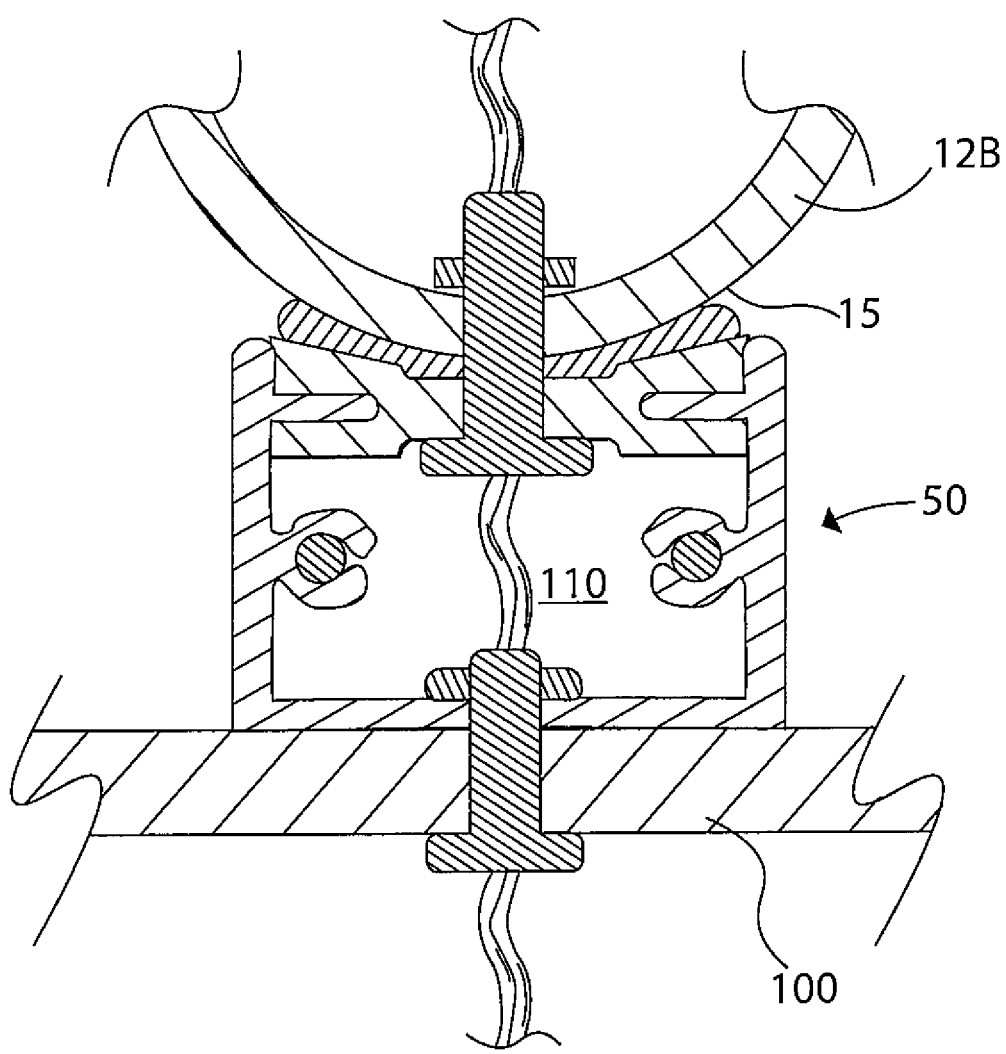
FIG. 11B is an end cross-sectional view of a mounting assembly with a device affixed thereto, mounted on a pole with a curved surface, in accordance with another embodiment.

FIG. 11A and FIG. 11B illustrate, respectively, another embodiment of the mounting assembly 10 as mounted on a flat pole 12A, and as mounted on a curved pole 12B. As both FIG. 11A and FIG. 11B illustrate, the housing 50 is configured with planar side panels 56 such that the angle β between the side panel portions 56A and 56B is about 180 degrees. However, each sliding engagement formation, e.g., ridge 58, is advantageously configured to lie in a plane P1 parallel to the main panel 51, as better seen in FIG. 4, and each sliding engagement formation, e.g., groove 35, is advantageously configured to lie in a corresponding plane P2 that is in alignment or coplanar with plane P1 when the house 50 and the plate 16 are in engagement. In that regard, each groove 35 is symmetrically bisected by the plane P1 and each ridge 58 is symmetrically bisected by the plane P2 so that each of these sliding engagement formations is nondiscriminatory of the orientation of the plate 16 and the housing 50 and can readily engage with each other regardless of whether the first surface 25 or the second surface 26 of the plate 16 is facing the housing 50.

It is understood that the additional embodiments of the mounting assembly include a housing that has grooves in lieu of ridges, and a plate that has ridges in lieu of grooves, wherein each ridge is advantageously configured to lie in a first plane and each groove is advantageously configured to lie in a second plane that is in alignment or coplanar with the first plane when the house and the plate are in engagement, and wherein each ridge and each groove is symmetrically bisected by the first and second planes, such that the ridges and the grooves are nondiscriminatory of the orientation of the plate and the housing and can readily engage with each other regardless of whether the first surface or the second surface of the plate is facing the housing.

It is also understood that any device to be affixed to the housing 50 may be affixed prior to or after the mount assembly 10 has been mounted on a pole (or support surface), provided the configuration of the device allows it to be affixed to or mounted on the housing 50 prior to or after the housing 50 has been mounted on the plate 16.

While embodiments of the mounting assembly have been described herein as for use with a pole, it is understood that the mounting assembly may be used to mount a device to any suitable surface or wall, including any suitable surface or wall in which openings for receiving fasteners and/or wires and cables are provided or may be formed.

The preceding description has been presented with reference to certain exemplary embodiments of the invention. Workers skilled in the art and technology to which this invention pertains will appreciate that alterations and changes to the described structure may be practiced without meaningfully departing from the principal, spirit and scope of this invention. It is understood that the drawings are not necessarily to scale. Accordingly, the foregoing description should not be read as pertaining only to the precise structures described and illustrated in the accompanying drawings. Rather, it should be read as consistent with and as support for the following claims which are to have their fullest and fairest scope.

What is claimed is:

1. A mounting assembly adapted to mount a device onto a support surface, comprising:
   a reversible plate and a housing, wherein the plate is configured to slidably engage with the housing in one of a forward orientation and a reverse orientation,
   wherein the plate has a body with a first planar surface, a second curved surface, and opposing side edges, each of said opposing side edges having a first sliding engagement formation,
   wherein the housing has a main panel, and opposing side panels, the main panel configured for attachment to the device, each of said opposing side panels having a second sliding engagement formation complementary to the first sliding engagement formation, and
   wherein the first sliding engagement formations lie in a first plane, and the second engagement formations lie in a second plane, the first and second planes being coplanar when the plate and housing are engaged, the first sliding engagement formations symmetrically bisected by the first plane and the second sliding engagement formations symmetrically bisected by the second plane, and
   wherein the plate is configured to face to the support surface with one of the first planar surface and the second curved surface opposite of the first planar surface.

2. The mounting assembly of claim 1, wherein the first planar surface is generally planar and the second curved surface is generally nonplanar.

3. The mounting assembly of claim 1, wherein the first planar surface is generally flat and the second curved surface is generally concave.

4. The mounting assembly of claim 1, wherein each of the first sliding engagement formations includes a groove, and each of the second sliding engagement formations includes a ridge.

5. The mounting assembly of claim 1, wherein the support surface includes a sidewall of a pole.

6. The mounting assembly of claim 5, wherein the device is a luminaire assembly.

7. The mounting assembly of claim 1, further comprising a top panel.

8. The mounting assembly of claim 1, further comprising a bottom panel.

9. The mounting assembly of claim 1, wherein each of the plate and the main panel includes at least one through-hole.

10. The mounting assembly of claim 9, wherein the at least one through-hole of the plate is configured to receive a fastener.

11. The mounting assembly of claim 9, wherein the at least one through-hole is configured to pass one wire extending from the device.

12. The mounting assembly of claim 9, wherein the at least one through-hole is elongated.

13. The mounting assembly of claim 1, wherein each side panel has a distal portion and a proximal portion that define an angle β therebetween, wherein the angle β ranges between about 120 and 180 degrees.

14. The mounting assembly of claim 1, wherein a proximal portion of each of said opposing side panels defines an angle α with the main panel, wherein the angle α ranges between about 90 and 120 degrees.

15. The mounting assembly of claim 14, further comprising a top panel.

16. A mounting assembly for releasably mounting a device on a pole, comprising:
a plate and a housing configured for sliding engagement,
wherein the plate has first and second opposing surfaces, the first opposing surface being generally flat and the second opposing surface having a concavity, the plate also has opposing side edges, each side edge having a first sliding engagement formation,
wherein the housing has a main panel and opposing side panels, each side panel having a second sliding engagement formation complementary to the first sliding engagement formation for sliding engagement therewith, the main panel is configured for attachment to the device,
wherein the first sliding engagement formations lie in a first plane, and the second sliding engagement formations lie in a second plane, the first and second planes being coplanar when the plate and housing are slidably engaged,
wherein each of the first sliding engagement formations is symmetrically bisected by the first plane and each of the second sliding engagement formations is symmetrical bisected by the second plane,
wherein each side panel has a proximal portion and a distal portion that defines an angle β therebetween, the angle β ranging between about 120 and 135 degrees, and
wherein the first sliding engagement formation includes a groove and the second sliding engagement formation includes a ridge.

17. The mounting assembly of claim 16, wherein the plate includes at least one through-hole.

18. The mount assembly of claim 16, wherein the main panel of the housing includes at least one through-hole.

19. A mounting assembly for releasably mounting a device on a pole, comprising:
a plate and a housing configured for sliding engagement,
wherein the plate has first and second opposing surfaces, the first opposing surface being generally flat and the second opposing surface having a concavity, the plate also has opposing side edges, each side edge having a first sliding engagement formation,
wherein the housing has a main panel and opposing side panels, each of said opposing side panels having a second sliding engagement formation complementary to the first sliding engagement formation for sliding engagement therewith, the main panel is configured for attachment to the device,
wherein the first sliding engagement formations lie in a first plane, and the second sliding engagement formations lie in a second plane, the first and second planes being coplanar when the plate and housing are slidably engaged,
wherein each of the first sliding engagement formations is symmetrically bisected by the first plane and each of the second sliding engagement formations is symmetrical bisected by the second plane,
wherein each of said opposing side panels has a proximal portion and a distal portion that defines an angle β therebetween, the angle β ranging between about 120 and 135 degrees, and
wherein the first sliding engagement formation includes a ridge and the second sliding engagement formation includes a groove.

* * * * *